(12) United States Patent
Reynolds (10) Patent No.: US 8,387,516 B1
(45) Date of Patent: Mar. 5, 2013

(54) COFFEE MAKER

(76) Inventor: D. Michael Reynolds, Dalton City, IL (US)

( * ) Notice: Subject to any disclaimer, the term of this patent is extended or adjusted under 35 U.S.C. 154(b) by 1363 days.

(21) Appl. No.: 11/593,400

(22) Filed: Nov. 6, 2006

Related U.S. Application Data (60) Provisional application No. 60/741,922, filed on Dec. 2, 2005.

(51) Int. Cl.
*A47J 31/40* (2006.01)
*A47J 31/02* (2006.01)

(52) U.S. Cl. ............. 99/282; 99/280; 99/285; 99/292; 99/295; 99/299; 99/300; 99/302 R; 99/302 C; 99/304; 99/305; 99/323.3; 99/283; 99/316; 222/145.1; 222/146.5; 222/242; 222/263; 222/486; 137/268

(58) Field of Classification Search ............. 99/282, 99/280, 285, 292, 295, 299, 300, 302 R, 302 C, 99/304, 305, 323.3, 283, 316; 137/268; 141/305, 141/59; 222/145.1, 146.5, 242, 263, 486; 422/261, 285
See application file for complete search history.

(56) References Cited

U.S. PATENT DOCUMENTS

| | | | |
|---|---|---|---|
| 2,464,862 A | | 3/1949 | Herrera ............... 99/307 |
| 2,783,703 A | * | 3/1957 | Brown ............... 99/283 |
| 3,085,494 A | | 4/1963 | Rosander ............... 99/283 |
| 3,085,495 A | | 4/1963 | Rosander ............... 99/283 |
| RE25,663 E | * | 10/1964 | Bunn ............... 99/282 |
| 3,381,604 A | | 5/1968 | Bixby ............... 99/283 |
| 3,423,209 A | | 1/1969 | Weber ............... 99/71 |
| 3,691,933 A | * | 9/1972 | Martin ............... 99/282 |
| 3,791,630 A | * | 2/1974 | Hinds, Jr. ............... 366/144 |
| 3,814,321 A | * | 6/1974 | Mulholland et al. ............... 239/135 |
| 3,834,588 A | * | 9/1974 | Jones ............... 222/61 |
| 3,870,471 A | * | 3/1975 | Tepas et al. ............... 422/106 |
| 4,111,337 A | * | 9/1978 | Lerner et al. ............... 222/146.5 |
| 4,143,589 A | | 3/1979 | Weber ............... 99/282 |
| 4,392,508 A | * | 7/1983 | Switall ............... 137/99 |
| 4,426,919 A | * | 1/1984 | Rhoten ............... 99/289 T |
| 4,464,981 A | * | 8/1984 | Stover ............... 99/280 |
| 4,603,621 A | * | 8/1986 | Roberts ............... 99/307 |
| 4,721,034 A | * | 1/1988 | Shimomura ............... 99/280 |
| 4,841,849 A | * | 6/1989 | Shimomura et al. ............... 99/282 |
| 4,876,953 A | * | 10/1989 | Imamura et al. ............... 99/280 |
| 4,922,809 A | * | 5/1990 | Fuhner ............... 99/283 |

(Continued)

FOREIGN PATENT DOCUMENTS

| | | | |
|---|---|---|---|
| JP | 2006034919 A | * | 2/2006 |
| WO | WO 2005004684 A1 | * | 1/2005 |

(Continued)

OTHER PUBLICATIONS

BUNN VPS, CWT and CDBCF coffee Makers, each of n/a which is commerical product of Bunn-O-Matic Corporation, Springfield, Illionois.

(Continued)

*Primary Examiner* — Henry Yuen
*Assistant Examiner* — Brett Spurlock
(74) *Attorney, Agent, or Firm* — Philip L. Bateman (57) ABSTRACT

A coffee maker contains a siphon tube for discharging hot water from a heated reservoir to a container for coffee grounds. Flow through the siphon tube is initiated by pressurizing the air space in the heated reservoir with an air pump. A siphon flow of hot water through the siphon tube to a coffee grounds container then continues without pressurization. The flow is ended when the desired volume of coffee is brewed.

3 Claims, 5 Drawing Sheets

U.S. PATENT DOCUMENTS

| | | | |
|---|---|---|---|
| 5,000,082 A * | 3/1991 | Lassota | 99/304 |
| 5,083,504 A * | 1/1992 | Koga et al. | 99/302 R |
| 5,403,564 A * | 4/1995 | Katschnig et al. | 422/307 |
| 5,927,179 A * | 7/1999 | Mordini et al. | 99/304 |
| 6,082,247 A * | 7/2000 | Beaulicu | 99/302 R |
| 6,095,031 A * | 8/2000 | Warne | 99/282 |
| 6,253,667 B1 * | 7/2001 | Lussi et al. | 99/455 |
| 6,845,704 B2 * | 1/2005 | Lassota et al. | 99/280 |
| 7,228,066 B2 * | 6/2007 | Pope | 392/441 |
| 7,578,230 B2 * | 8/2009 | Rahn | 99/282 |
| 7,827,904 B2 * | 11/2010 | Kobylarz | 99/280 |
| 2003/0126993 A1 * | 7/2003 | Lassota et al. | 99/279 |
| 2004/0194631 A1 * | 10/2004 | Pope | 99/279 |
| 2005/0284304 A1 * | 12/2005 | Kobylarz | 99/283 |
| 2006/0207432 A1 * | 9/2006 | Van Der Meer et al. | 99/279 |
| 2007/0186780 A1 * | 8/2007 | Clark | 99/275 |
| 2007/0214966 A1 * | 9/2007 | Bishop et al. | 99/280 |

FOREIGN PATENT DOCUMENTS

WO    WO 2005072575 A1 *   8/2005

OTHER PUBLICATIONS

Grindmaster B3 coffee maker, a commerical product n/a of Grindmaster Corporation, Louisville, Kentucky.

* cited by examiner

COFFEE MAKER

CROSS-REFERENCE TO RELATED APPLICATION

This application claims the benefit of U.S. Provisional Application Ser. No. 60/741,922, Dec. 2, 2005.

FIELD OF THE INVENTION

This invention relates to food and beverage devices. More particularly, this invention relates to coffee makers.

BACKGROUND OF THE INVENTION

Coffee is a drink made by passing hot water and/or steam through the roasted and ground beans of the coffee plant. The process of making coffee is commonly known as brewing. Coffee is the most popular hot drink in the United States and many foreign countries.

A variety of coffee makers are used to brew coffee. Home coffee makers typically have a reservoir or tank which is usually empty. When coffee is desired, the reservoir is filled with fresh cold water, the water is heated to the desired temperature (typically about 200° F.), and then all the water is released from the reservoir to flow through the coffee grounds and into a pot. Home coffee makers are relatively slow because of the time it takes for the water to heat in the reservoir.

Commercial coffee makers typically have a large reservoir which is partially or completely filled with water at all times. The reservoir is heated so the water in the reservoir is always hot. When a pot of coffee is desired, water from the top of the reservoir is released to flow through the coffee grounds and into the pot. The density of water decreases as its temperature increases so the hottest water in the reservoir rises to the top. Commercial coffee makers are much faster than home coffee makers because there is no wait for the water to heat to the desired temperature.

Figure 1:
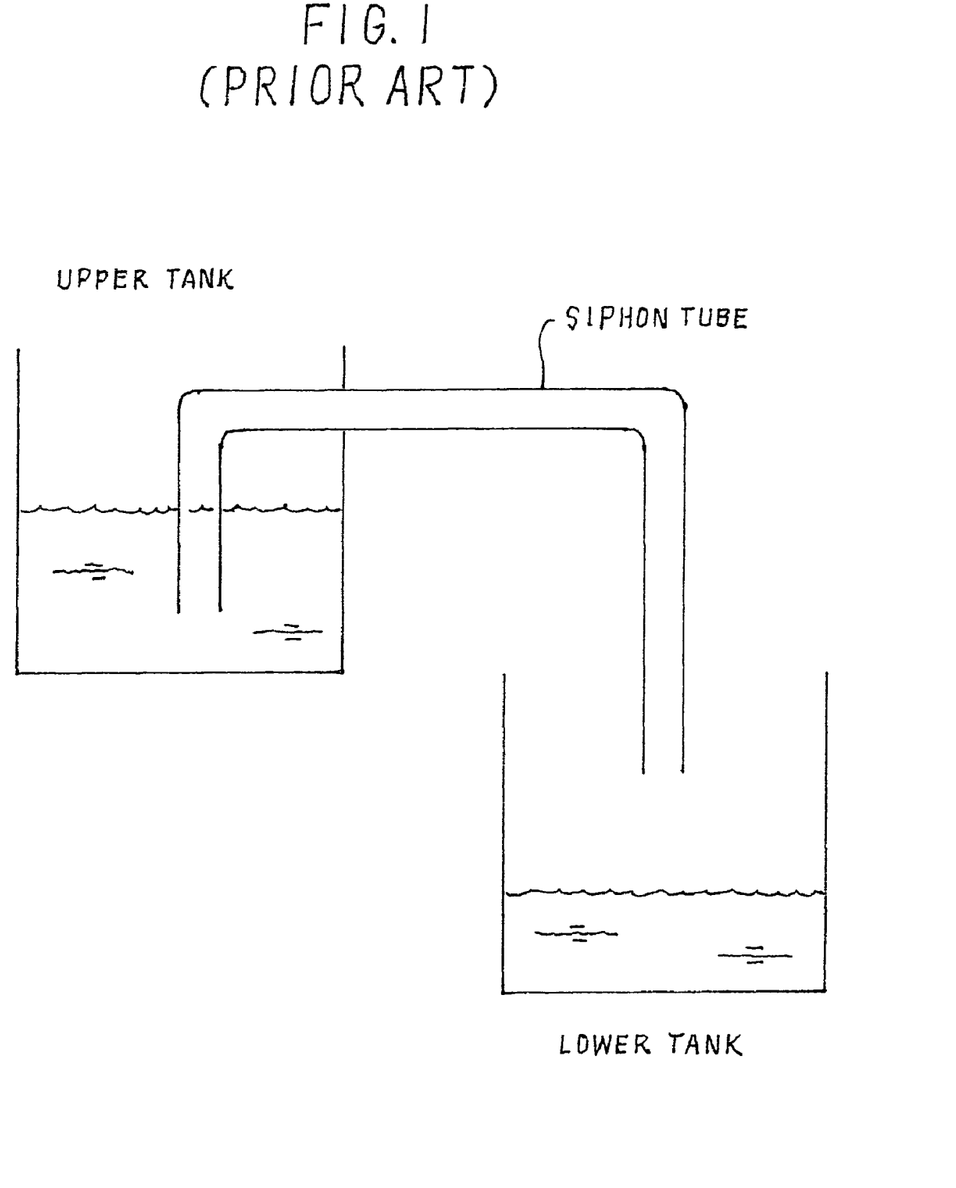
FIG. 1 is an illustration of a prior art siphon.

Commercial coffee makers contain various means for starting and stopping the flow of the water from the reservoir to the grounds. One type of coffee maker uses a siphon. A siphon is a flow of water from one level, through an elevated tube, to a lower level. A siphon is illustrated in FIG. 1. With the water levels as shown, no flow through the elevated siphon tube occurs. To begin the flow, the elevated siphon tube must be completely filled with liquid. This can be accomplished by: (1) raising the liquid level in the upper tank to the uppermost part of the siphon tube; (2) sealing the upper tank and then pressurizing it to force the liquid up the siphon tube; or (3) sealing the lower tank and applying a vacuum. Once the siphon flow begins, it will continue until the level in the upper tank drops to the inlet or until the siphon is "broken" by opening the tube to the atmosphere.

Figure 2:
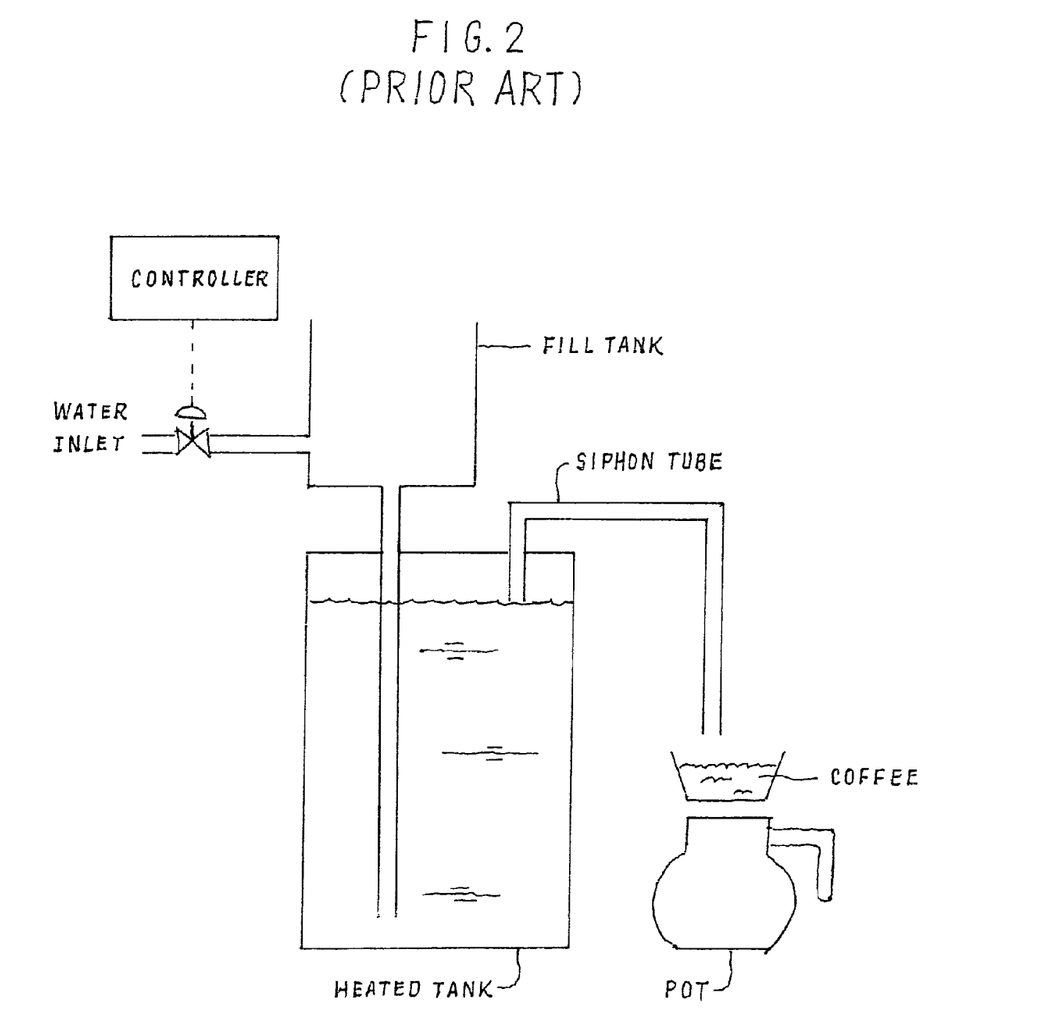
FIG. 2 is a diagram of a first type of prior art coffee maker.

A siphon-type commercial coffee maker is illustrated in FIG. 2. When a pot of coffee is desired, a measured volume of water is added to the fill tank, either manually or through a timer-controlled fill valve in the water inlet line. The cold water flows from the fill tank down a tube into the bottom of the heated reservoir. As soon as the water level exceeds the height of a siphon tube, the flow of hot water out of the heated reservoir begins. The flow continues until the fill tank is emptied and the water level in the heated reservoir drops to the intake of the siphon tube. This type of coffee maker immediately dispenses a volume of water from the heated reservoir that is equal to the volume of cold water added to the reservoir. A major disadvantage of this coffee maker is that the brewing of coffee always begins at the time the water is added. In other words, a delay between the time the water is added and the brewing begins is not possible. Another disadvantage is that there is no means for stopping the sipon flow once it begins. Examples of such a coffee maker are the BUNN VPS (manual fill) and BUNN CWT (timer-controlled fill valve) coffee makers, both of which are commercial products of Bunn-O-Matic Corporation of Springfield, Ill.

Figure 3:
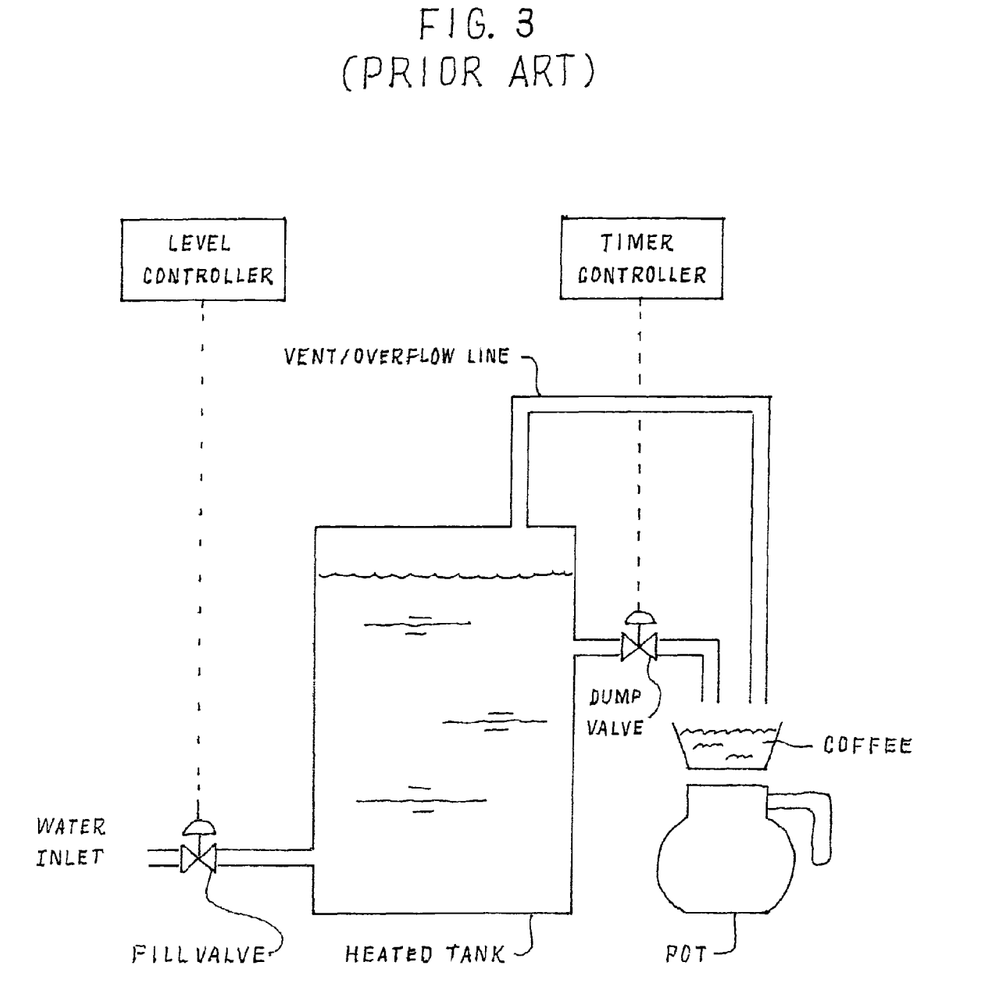
FIG. 3 is a diagram of a second type of prior art coffee maker.

A second type of commercial coffee maker is illustrated in FIG. 3. This type of coffee maker contains a water level controller that controls a fill valve in the water inlet to maintain a constant level in the heated reservoir. The coffee maker also contains a timer controller that controls a valve in the outlet line (commonly known as a dump valve) that opens for a period of time and then closes. The coffee maker also contains a vent/overflow line that serves two purposes: (1) it maintains the heated reservoir at atmospheric pressure so water will flow out the outlet line; and (2) it provides an overflow in the event the fill valve malfunctions and fails to close. A major disadvantage of this coffee maker is that the dump valve requires frequent maintenance because lime from the hot water tends to build up at the valve. Lime deposits form from cold water at a much slower rate so maintenance on the fill valve is generally not a problem. Examples of such a coffee maker are the BUNN CDBCF coffee maker, a commercial product of Bunn-O-Matic Corporation of Springfield, Ill., and the GRINDMASTER B3 coffee maker, a commercial product of Grindmaster Corporation of Louisville, Ky.

A third type of commercial coffee maker dispenses water from the reservoir only when an air compressor runs. Coffee makers of this type are disclosed in Herrera, U.S. Pat. No. 2,464,862, Mar. 22, 1949; Rosander, U.S. Pat. No. 3,085,494, Apr. 16, 1963; Rosander, U.S. Pat. No. 3,085,495, Apr. 16, 1963; Bixby, U.S. Pat. No. 3,381,604, May 7, 1968; Weber, U.S. Pat. No. 3,423,209, Jan. 21, 1969; Weber, U.S. Pat. No. 4,143,589, Mar. 13, 1979; and Beaulicu, U.S. Pat. No. 6,082, 247, Jul. 4, 2000. The disadvantages of this type of coffee maker are that the air compressor is noisy and requires frequent service because it runs the entire time the coffee is being brewed.

Accordingly, there is a demand for an improved coffee maker. More particularly, there is a demand for a coffee maker that does not require a dump valve or a continuously running air compressor, that can dispense hot water independently of the time water is added, and that can dispense any desired volume of hot water.

SUMMARY OF THE INVENTION

The general objects of this invention are to provide an improved coffee maker and an improved method of brewing coffee. More particular objects are to provide a coffee maker that does not require a dump valve or a continuously running air compressor, that can dispense hot water independently of the time water is added, and that can dispense any desired volume of hot water.

I have invented an improved coffee maker. The coffee maker comprises: (a) a heated reservoir for holding a volume of hot water such that the hot water forms a level within the heated reservoir with an air space existing above the level of the hot water; (b) an inlet to the heated reservoir for adding water; (c) a siphon tube for discharging hot water from the heated reservoir, the siphon tube having an intake at or below the level of hot water, then rising above the level of hot water, and then descending to an outlet at a level below the intake; (d) a container for coffee grounds located below the siphon tube outlet; (e) a means for temporarily sealing the heated reservoir; and (f) an air pump having a discharge line communicating with the heated reservoir for creating sufficient pressure in the sealed heated reservoir for a period of time sufficient to force hot water into the siphon tube and begin the siphon flow of hot water from the heated reservoir to the coffee grounds container.

The coffee maker of this invention does not require a dump valve or a continuously running air compressor, can dispense hot water independently of the time water is added, and can dispense any desired volume of hot water.

DETAILED DESCRIPTION OF THE INVENTION

Figure 4:
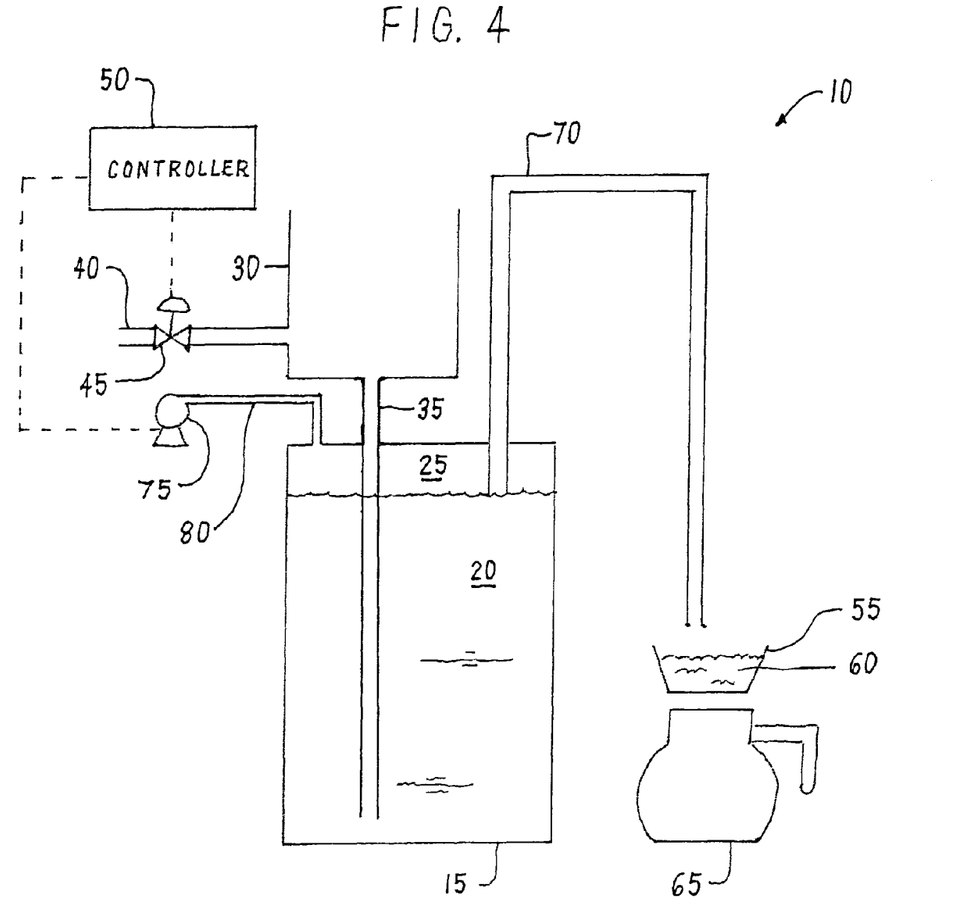
FIG. 4 is a diagram of a first embodiment of the coffee maker of this invention.

This invention is best understood by reference to the drawings. A first embodiment 10 of the coffee maker of this invention is shown in FIG. 4. This coffee maker is similar in some respects to the prior art coffee maker shown in FIG. 2. It has a heated reservoir or tank 15 for holding a volume of hot water 20 that is less than the volume of the tank itself. Accordingly, an air space 25 exists above the level of the hot water. The heated reservoir or tank is generally made of steel, is heated by electrical resistors or the like (not shown), and has a volume of about one to ten gallons. A fill tank 30 is positioned above the heated reservoir and a vertical fill tube 35 provides communication between the two tanks. A water line 40 is connected to the fill tank. A valve 45 in the water line is controlled by an electronic controller 50. The coffee maker has a container 55 for coffee grounds 60 and a base (not shown) for a coffee pot 65.

This coffee maker differs from the prior art coffee maker shown in FIG. 2 in two major ways. The first change is that the height of the siphon tube 70 is raised to a level above the fill tank. With this change, the addition of water to the fill tank does not, by itself, begin the flow of water out the siphon tube. The second major change is that an air pump 75 is added which can pressurize the air space in the heated reservoir via a pressurized air line 80. A suitable air pump is the ELITE 802 air pump, a commercial product of Rolf C. Hagen Inc. of Montreal, Quebec, Canada. This air pump is commonly used to add air to an aquarium. The air pump is controlled by the controller.

The operation of the coffee maker can now be considered. The level of hot water is the heated reservoir is generally at the level shown in FIG. 4. This level is at the inlet to the siphon tube. To prepare the coffee maker to dispense coffee, the desired volume of water is added to the fill tank. The desired volume can be added manually or by a timer-controlled fill valve, but it is preferably added by a level-controlled fill valve. A major advantage of a level-controlled fill valve is that it adds the same amount of water regardless of the pressure in the water inlet line. The added water flows down the vertical fill tube into the bottom of the heated reservoir and the water level rises above the siphon tube inlet, both inside and outside the siphon tube. The water in the fill tank and vertical fill tube creates a seal from the atmosphere in the heated reservoir.

When coffee is desired, the air pump is turned on for a period of time sufficient to pressurize the heated reservoir and force the water all the way up the siphon tube. As soon as the horizontal portion of the siphon tube is filled, water begins to flow by siphon action. Pressure is no longer required so the air pump is turned off. The time needed to initiate siphon flow is very short—less than about five seconds and typically about one-half to two seconds. Once siphon flow begins, it will continue until the level in the heated reservoir drops to the level of the siphon tube inlet as shown in FIG. 4. The hot water leaves the outlet of the siphon tube, flows through the ground coffee beans, and into the coffee pot.

It can be appreciated that the first embodiment of the coffee maker does not have a dump valve that is prone to malfunction because of lime deposits. Therefore, the coffee maker of this invention never requires maintenance on a dump valve. Nor does the coffee maker have a continuously running air compressor—its air pump runs for no more than a second or two during each brewing cycle. Therefore, the coffee maker is quieter and requires little, if any, maintenance on the air pump. The coffee maker can dispense hot water independently of the time water is added. In other words, it can begin the brewing of coffee simultaneously with the addition of the cold water or it can begin the brewing at a later time because the brewing is not begun until the air pump is turned on. And finally, the coffee maker can dispense any desired volume of hot water because the volume discharged is equal to the volume added to the fill tank.

Figure 5:
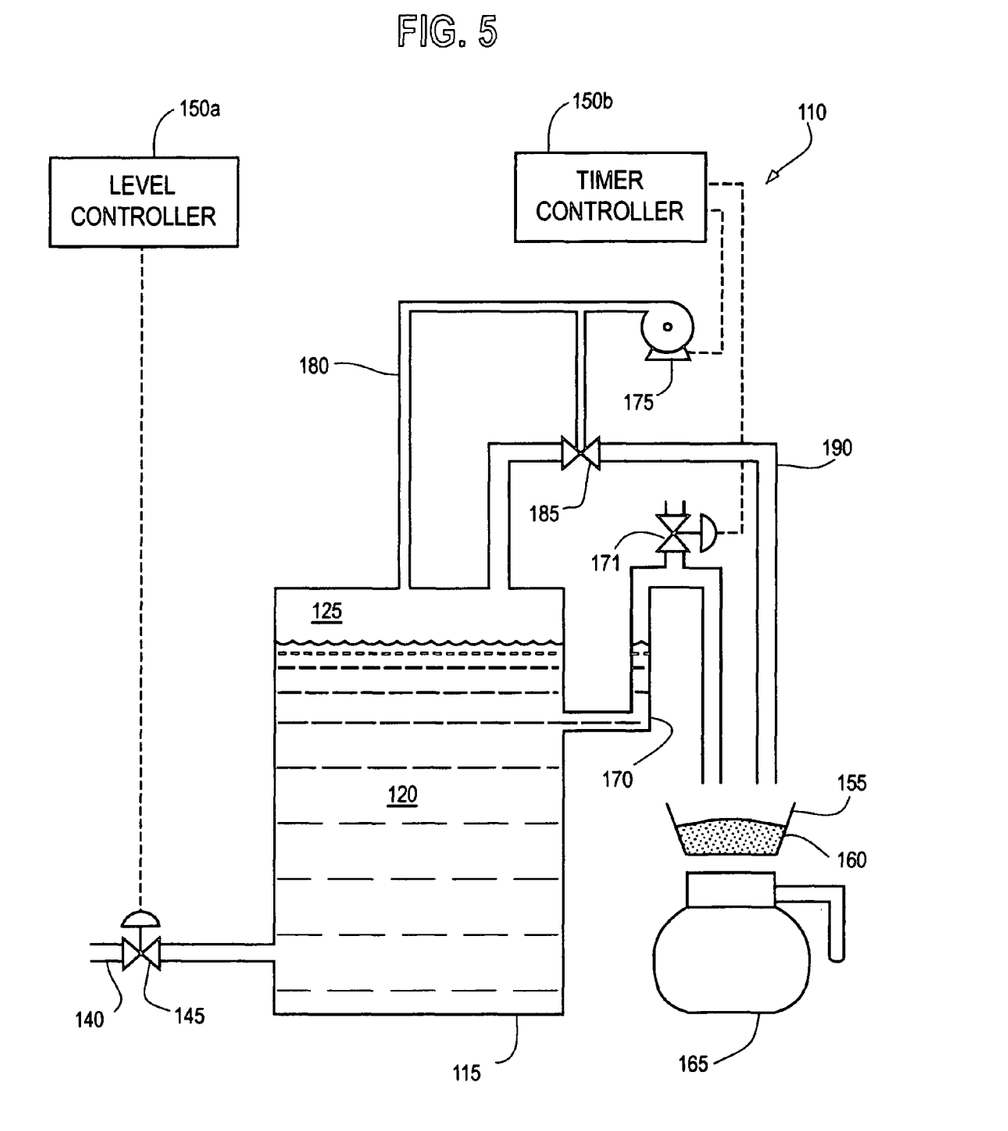
FIG. 5 is a diagram of a second embodiment of the coffee maker of this invention.

A second embodiment 110 of the coffee maker of this invention is shown in FIG. 5. This coffee maker is similar in some respects to the prior art coffee maker shown in FIG. 3. It has a heated reservoir or tank 115 for holding a volume of hot water 120 that is less than the volume of the tank itself. Accordingly, an air space 125 exists above the level of the hot water. A water inlet line 140 is connected to the heated reservoir. A fill valve 145 in the water inlet line is controlled by a level controller 150a to maintain constant level of water in the heated reservoir. The coffee maker has a container 155 for coffee grounds 160 and a base (not shown) for a coffee pot 165.

This coffee maker differs from the prior art coffee maker shown in FIG. 3 in several ways. A first change is that the outlet tube is reconfigured from a horizontal tube into a siphon tube 170 that rises above the level of water in the heated reservoir. A stop valve 171 is added to the siphon tube at a point above the water level in the heated reservoir. When the stop valve is open, communication between the atmosphere and the horizontal section of the siphon tube exists. As explained below, the opening of the stop valve is the mechanism for stopping the siphon flow of water. The stop valve is preferably operated by a solenoid (not shown) that is controlled by a timer controller 150b. If desired, the level controller and the timer controller are within the same housing.

A second change is that a vent valve 185 is added to the vent/overflow line 190. When the vent valve is open, communication between the atmosphere and the heated reservoir exists. A third change is that an air pump 175 is added which can pressurize the air space in the heated reservoir via pressurized air line 180. The same type of air pump suitable for the first embodiment is suitable for the second embodiment. The pressurized air from the air pump is also used to operate the vent valve.

The operation of the second embodiment of the coffee maker can now be considered. The level of hot water in the heated reservoir remains at the level shown in FIG. 5 at all times due to the action of the water inlet fill valve and the level controller. Both the vent valve and the stop valve are normally in the open position. When coffee is desired, the air pump is turned on for a very short period of time. The air pressure immediately closes the vent valve to seal the heated reservoir from the atmosphere and pressure quickly builds inside the heated reservoir. At the same time, the stop valve is closed. The pressure in the heated reservoir forces hot water all the way up the siphon tube. As soon as the horizontal portion of the siphon tube is filled, water begins to flow by siphon action. Pressure is no longer required so the air pump is turned off and the vent valve reopens. The time needed to initiate siphon flow is generally less than five seconds and is typically about one-half to two seconds. Once siphon flow begins, it will continue until stop valve is opened to break the siphon. If the stop valve were not opened, the siphon flow would continue indefinitely because the water inlet valve would remain open to maintain the water level in the heated reservoir above the level of the siphon tube inlet.

It can be appreciated that the second embodiment of the coffee maker does not have a dump valve that is prone to malfunction because of lime deposits. Therefore, the coffee maker of this invention never requires maintenance of a dump valve. Nor does the coffee maker have a continuously running air compressor—its air pump runs for no more than a second or two during each brewing cycle. Therefore, the coffee maker is quieter and requires little, if any, maintenance on the air pump. It can also be appreciated that the coffee maker can dispense hot water at any time—when water is added or at any desired time afterwards. And finally, the coffee maker can dispense any desired volume of hot water because the volume discharged is determined by how long the siphon flow continues before the stop valve in the siphon tube is opened to break the siphon.

The coffee maker of this invention can be provided by modifying an existing coffee maker or by new construction. The size, complexity, and cost of the coffee maker is comparable to conventional coffee makers. Unlike any conventional coffee maker, the coffee maker of this invention does not require a dump valve or a continuously running air compressor, can dispense hot water independently of the time water is added, and can dispense any desired volume of hot water.

I claim:

1. A coffee maker comprising:
(a) a heated reservoir for holding a volume of hot water such that the hot water forms a level within the heated reservoir with an air space above the hot water;
(b) an inlet to the heated reservoir for adding water;
(c) a level controller for maintaining a constant hot water level in the heated reservoir;
(d) a first vent line communicating between the air space in the heated reservoir and the atmosphere;
(e) a vent valve in the first vent line, the vent valve having a position that is normally open and being movable to a closed position when exposed to pressurized air;
(f) a siphon tube for discharging hot water from the heated reservoir, the siphon tube having an intake at or below the level of hot water, then rising to a top above the level of hot water, and then descending to an outlet at, a level that is always below the level of hot water, the siphon tube being free of any pump means;
(g) a second vent line communicating between the top of the siphon tube and the atmosphere;
(h) a stop valve in the second vent line, the stop valve having a position that is normally closed and being movable to an open position;
(i) a container for coffee grounds located below the siphon tube outlet;
(j) an air pump having a discharge line that communicates with the heated reservoir and the vent valve; and
(k) a controller for initiating a brewing cycle by turning the air pump on and thereby closing the vent valve and beginning siphon flow through the siphon tube, for continuing the brewing cycle by turning the air pump off after a period of less than about five seconds such that the vent valve returns to the open position and siphon flow through the siphon tube continues, and for terminating a brewing cycle by momentarily opening the stop valve.

2. A coffee maker comprising:
(a) a heated reservoir for holding a volume of hot water such that the hot water forms a level within the heated reservoir with an air space above the hot water;
(b) an inlet to the heated reservoir for adding water;
(c) a means for maintaining a constant hot water level in the heated reservoir;
(d) a first vent line communicating between the air space in the heated reservoir and the atmosphere;
(e) a vent valve in the first vent line, the vent valve having a position that is normally open and being movable to a closed position;
(f) a siphon tube for discharging hot water from the heated reservoir, the siphon tube having an intake at or below the level of hot water, then rising to a top above the level of hot water, and then descending to an outlet at a level that is always below the level of hot water, the siphon tube being free of any pump means;
(g) a second vent line communicating between the top of the siphon tube and the atmosphere;
(h) a stop valve in the second vent line, the stop valve having a position that is normally closed and being movable to an open position;
(i) a container for coffee grounds located below the siphon tube outlet;
(j) an air pump having a discharge line that communicates with the heated reservoir; and
(k) a controller for: (i) initiating a brewing cycle by turning the air pump on, closing the vent valve, and thereby causing siphon flow through the siphon tube to begin; (ii) continuing the brewing cycle by turning the air pump off, returning the vent valve to the open position, and thereby allowing siphon flow through the siphon tube to continue; and (iii) terminating a brewing cycle by momentarily opening the stop valve and thereby stopping siphon flow through the siphon tube.

3. A method for brewing coffee comprising:
(a) obtaining a coffee maker comprising:
(i) a heated reservoir for holding a volume of hot water such that the hot water forms a level within the heated reservoir with an air space above the hot water;
(ii) an inlet to the heated reservoir for adding water;
(iii) a level controller for maintaining a constant hot water level in the heated reservoir;
(iv) a first vent line communicating between the air space in the heated reservoir and the atmosphere;
(v) a vent valve in the first vent line, the vent valve having a position that is normally open and being movable to a closed position when exposed to pressurized air;
(vi) a siphon tube for discharging hot water from the heated reservoir, the siphon tube having an intake at or below the level of hot water, then rising to a top above the level of hot water, and then descending to an outlet at a level that is always below the level of hot water, the siphon tube being free of any pump means;

(vii) a second vent line communicating between the top of the siphon tube and the atmosphere;
(viii) a stop valve in the second vent line, the stop valve having a position that is normally closed and being movable to an open position;
(ix) a container for coffee grounds located below the siphon tube outlet;
(x) an air pump having a discharge line that communicates with the heated reservoir and the vent valve; and
(xi) a controller for turning the air pump on and off and for opening and closing the stop valve;
(b) connecting the inlet to the heated reservoir to a source of water and placing coffee grounds in the container for coffee grounds;
(c) initiating a brewing cycle by turning the air pump on and thereby closing the vent valve and beginning siphon flow through the siphon tube;
(d) continuing the brewing cycle by turning the air pump off after a period of less than about five seconds such that the vent valve returns to the open position and siphon flow through the siphon tube continues; and
(e) terminating the brewing cycle by momentarily opening the stop valve.

\* \* \* \* \*